(12) United States Patent
Wang et al.

(10) Patent No.: US 8,031,668 B2
(45) Date of Patent: Oct. 4, 2011

(54) METHOD FOR OPTIMIZING DISCONTINUOUS RECEPTION IN RANDOM ACCESS AND SCHEDULING REQUEST

(75) Inventors: Chung-Shan Wang, Sinfong Township, Hsinchu County (TW); Chunli Wu, Beijing (CN); Tsung-Liang Lu, Taipei (TW)

(73) Assignee: Sunplus Mmobile Inc., Hsinchu Science Park (TW)

( * ) Notice: Subject to any disclaimer, the term of this patent is extended or adjusted under 35 U.S.C. 154(b) by 122 days.

(21) Appl. No.: 12/457,800

(22) Filed: Jun. 22, 2009

(65) Prior Publication Data

US 2009/0316593 A1 Dec. 24, 2009

Related U.S. Application Data

(60) Provisional application No. 61/129,384, filed on Jun. 23, 2008.

(51) Int. Cl.
*H04W 4/00* (2009.01)

(52) U.S. Cl. ......... 370/329; 370/252; 370/337; 455/450

(58) Field of Classification Search .................. 370/329, 370/337, 252; 455/450

See application file for complete search history.

(56) References Cited

U.S. PATENT DOCUMENTS

| | | | | |
|---|---|---|---|---|
| 2009/0176502 | A1* | 7/2009 | Kuo | 455/450 |
| 2009/0303896 | A1* | 12/2009 | Che et al. | 370/252 |
| 2009/0316638 | A1* | 12/2009 | Yi et al. | 370/329 |
| 2010/0202420 | A1* | 8/2010 | Jersenius et al. | 370/337 |
| 2010/0260132 | A1* | 10/2010 | Rao | 370/329 |

OTHER PUBLICATIONS

3rd Generation Partnership Project, Technical Specification Group Radio Access Network; Evolved Universal Terrestrial Radio Access (E-UTRA) Medium Access Control (MAC) Protocol Specification, Mar. 2008, 1-30, V.8.1.0, 3GPP Organizational Partners, France.

* cited by examiner

*Primary Examiner* — Albert T Chou
(74) *Attorney, Agent, or Firm* — Bacon & Thomas, PLLC (57) ABSTRACT

In a method for optimizing discontinuous reception mechanism in random access or scheduling request, the user equipment behaves according to a TTI window and a contention resolution timer so that the user equipment is at active time to monitor PDCCH. In the random access, the UE is at active time while a PDCCH indicating a new transmission addressed to the C-RNTI of the UE has not been received after successful reception of a Random Access Response for the non-contention preamble. In the scheduling request, the UE is at active time while an UL grant for the UE has not been received after SR has been sent.

13 Claims, 13 Drawing Sheets

METHOD FOR OPTIMIZING DISCONTINUOUS RECEPTION IN RANDOM ACCESS AND SCHEDULING REQUEST

CROSS-REFERENCE TO RELATED APPLICATION

This application claims the benefit of the filing date of U.S. Provisional Application Ser. No. 61/129,384, entitled "A DISCONTINUOUS RECEPTION MECHANISM" filed Jun. 23, 2008, under 35 USC & 119(e)(1).

BACKGROUND OF THE INVENTION

1. Field of the Invention

The present invention relates to a discontinuous reception mechanism and, more particularly, to a method for optimizing discontinuous reception mechanism in random access and scheduling request.

2. Description of Related Art

There are only two different Radio Resource Control (RRC) states, RRC_IDLE and RRC_CONNECTED, in Evolved Universal Terrestrial Radio Access (E-UTRA), unlike the four different RRC connected states adopted in Universal Mobile Telecommunication System (UMTS). In order to achieve better user equipment (UE) power saving while preventing unnecessary UE state transitions between RRC_IDLE and RRC_CONNECTED, Discontinuous Reception (DRX) is introduced in E-UTRA. In E-UTRA, generally the UE has to always monitor the Physical Downlink Control Channel (PDCCH), which informs the LE about the resource allocation of Paging Channel (PCH) and Downlink Shared Channel (DL-SCH), and Hybrid ARQ information related to DL-SCH and also carries the uplink scheduling grant. The introduction of DRX functionality enables UE to stop monitoring PDCCH for uplink (UL) and downlink (DL) transmission during some period of time, so that the UE only needs to be "awake" during the "active-time" duration.

In the current DRX mechanism in E-UTRA (see "E-UTRA MAC protocol specification (Release 8); 3GPP TS 36.321 V8.1.0 (2008-03); 3rd Generation Partnership Project; Technical Specification Group Radio Access Network", which is incorporated herein for reference), the UE behaviors are mainly determined by several relevant timers and/or whether some conditions are fulfilled. The timing to start and stop such timers, and corresponding UE behaviors upon the expiration of such timers are also defined.

In view of the DRX mechanism, the UE may be configured with a DRX functionality that allows it to not continuously monitor the PDCCH. The time UE should monitor PDCCH is defined as Active Time which is mainly determined by several relevant timers and/or whether some conditions are fulfilled. Specifically, when a DRX cycle has been configured, the UE shall be operated according to the DRX functionality illustrated in the following Table 1.

TABLE 1

When a DRX cycle is configured, the Active Time includes the time while:
 the On Duration Timer or the DRX Inactivity Timer or a DRX Retransmission Timer or the Contention Resolution Timer is running; or
 a Scheduling Request is pending (as described in subclause 5.4.4); or an uplink grant for a retransmission can occur; or
 a PDCCH indicating a new transmission addressed to the C-RNTI or Temporary C-RNTI of the UE has not been received after successful reception of a Random Access Response (as described in subclause 5.1.4).

The Active Time defined in current DRX mechanism covers the sub-frames in which UE needs to monitor PDCCH, but there're some unnecessary overlaps between the conditions and for some cases, e.g. random access procedure and scheduling request procedure, UE monitors PDCCH in sub-frames when it does not need to, causing unnecessary UE power consumption which is defeating the purpose of DRX mechanism.

From MAC's point of view, currently there are two different Random Access (RA) procedures according to different causes of initiation of the RA procedure: one is non-contention based (e.g. initiated by a PDCCH order for the case of DL data resuming) and the other is contention based (e.g. the cases of initial access, UL data arrival triggered Buffer Status Report (BSR) which triggers RA when there's no dedicated scheduling request resource).

Figure 1A:
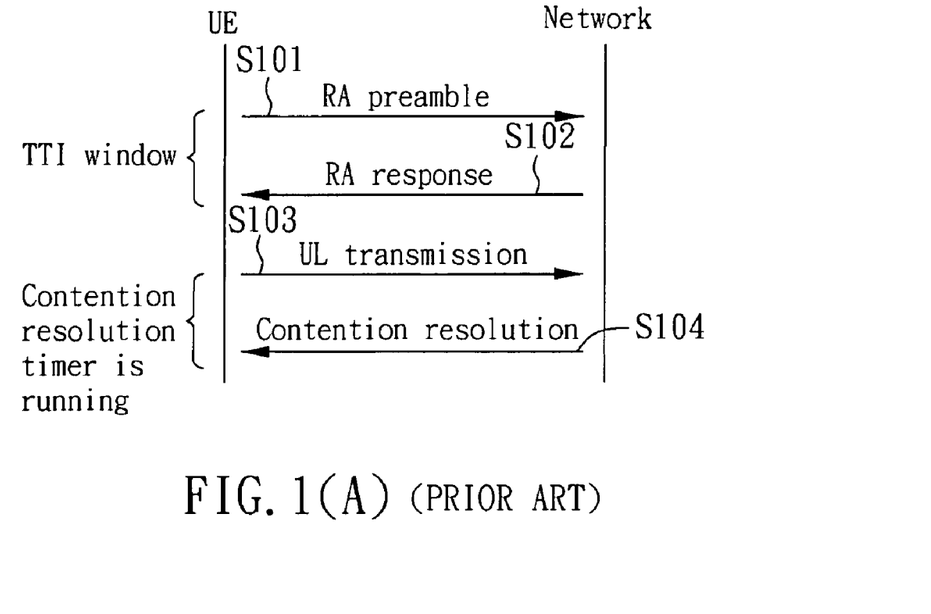
FIGS. 1(A)-(C) schematically illustrate a contention based RA procedure.

In contention based RA procedure, as shown in FIG. 1(A), UE first sends an RA preamble to the network (step S101) on Physical Random Access Channel (PRACH), and then UE is expected to monitor PDCCH for RA response within a TTI window after its transmission of the RA preamble (step S102). When UE transmits the first scheduled UL transmission according to the UL grant indicated in the RA response (step S103), it is expected to monitor PDCCH for contention resolution until it receives the message for contention resolution (step 104), or until the expiration of the Contention Resolution Timer.

Figure 1B:
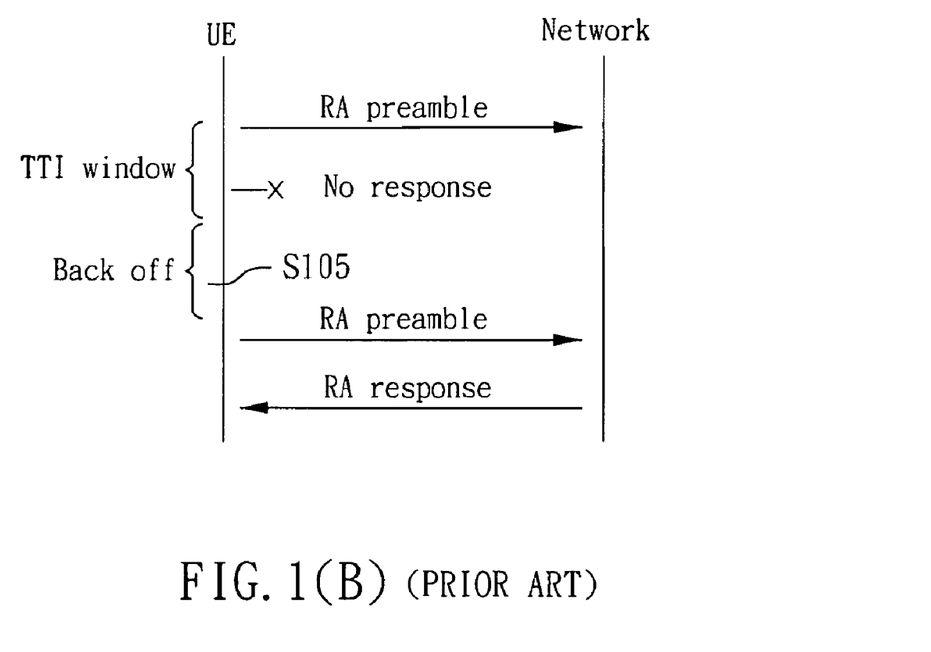
Figure 1C:
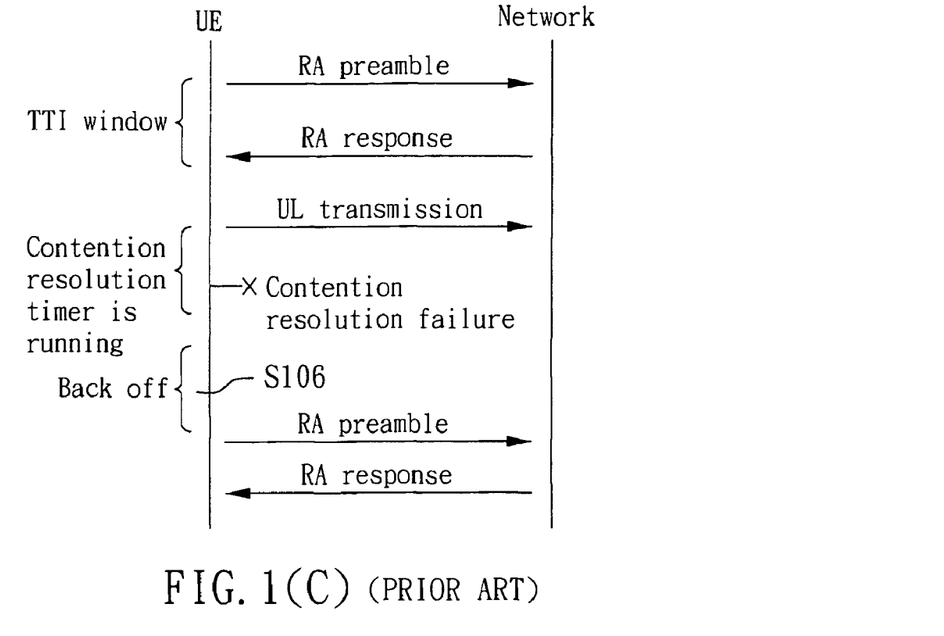
Figure 1D:
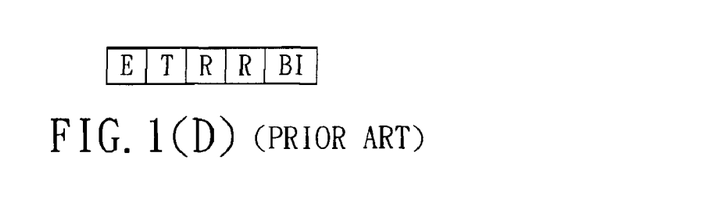
FIG. 1(D) shows the back off indicator included in the RA response.

Back off Indicator can be included in RA response as FIG. 1(D) shows. The BI field indicates the back off parameter value. Upon receiving RA response with BI, UE stores the value as back off parameter. When receiving RA response without BI, the value stored in the UE is set to 0. The value is initiated as 0. When UE applies back off, it delays the subsequent preamble transmission by the back off time which is computed by the UE base on the stored back off parameter.

If the UE does not receive its RA response within TTI window after it transmits preamble, as shown in FIG. 1(B), it will apply back off (step S105) and start another round of RA attempted to send RA preamble at next available PRACH resource. Alternatively, if the UE finds itself failed the contention resolution either because of no contention resolution message is received before the expiration of Contention Resolution Timer or because of the contention resolution message contains Contention Resolution Identity for other UE, as shown in FIG. 1(C), it will apply back off and start another round of RA attempted to send RA preamble at next available PRACH resource.

Figure 2:
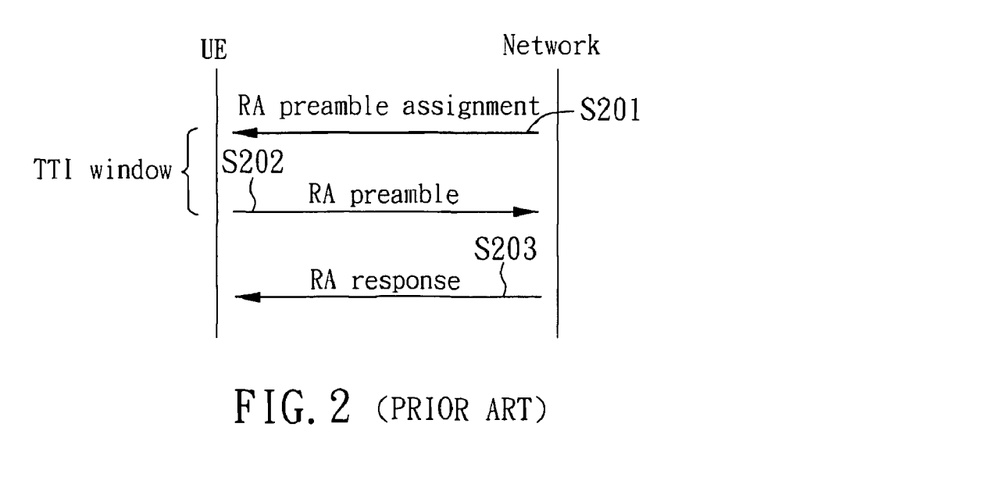
FIG. 2 schematically illustrates a non-contention based RA procedure.

While for non-contention based RA procedure, as shown in FIG. 2, UE first receives an RA preamble assignment from the network (step S201) and sends an RA preamble as assigned to the network (step S202). Then, UE is expected to monitor PDCCH for RA response within a TTI window after its transmission of the preamble (step S203).

Figure 3A:
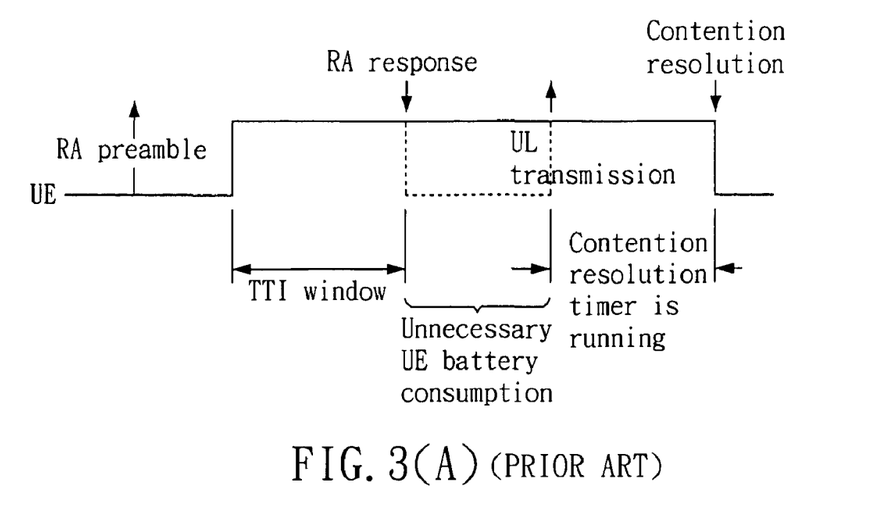
FIGS. 3(A)-(C) schematically illustrate the behavior of the UE for contention based RA procedure.
Figure 3B:
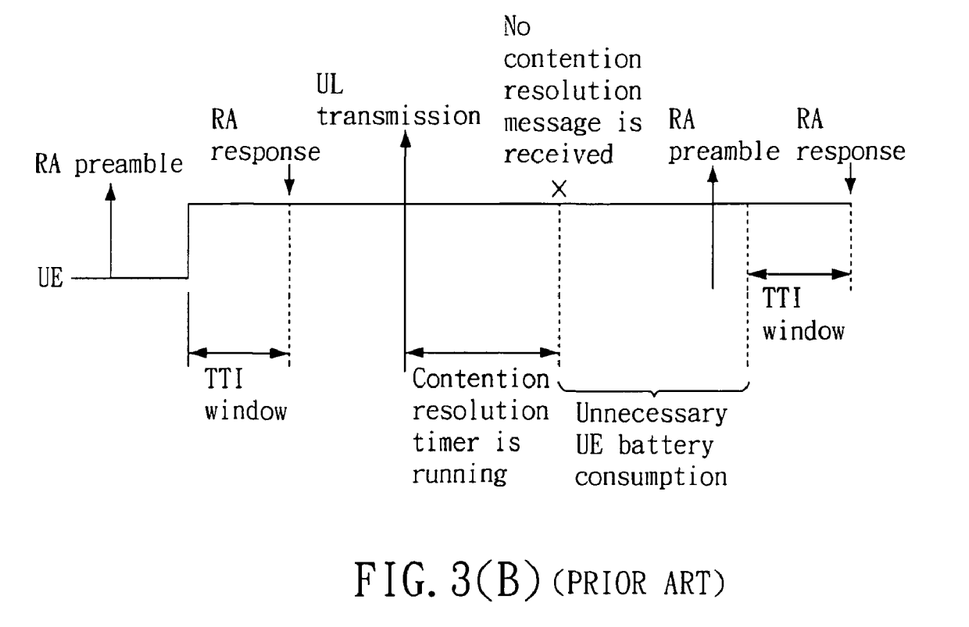
Figure 3C:
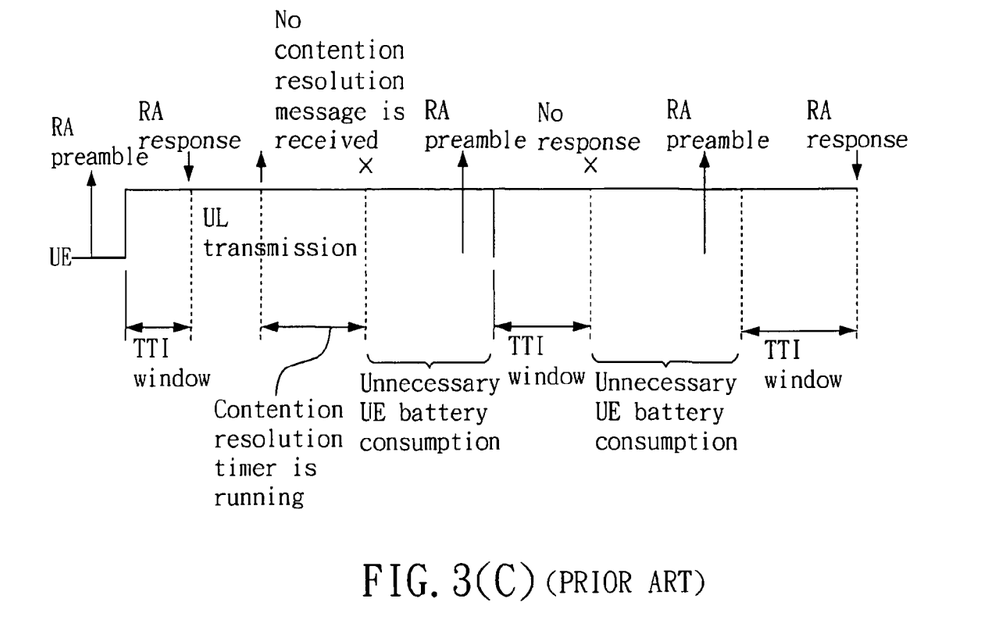

According to current DRX mechanism, when UE is in the DRX mode, UE will keep on monitoring PDCCH when "a PDCCH addressed to the C-RNTI or Temporary C-RNTI of the UE has not been received after successful reception of a Random Access Response". It is valid for both contention based and non-contention based RA procedure. However for contention based RA procedure, as shown in FIG. 3(A), after successfully receiving its RA response, UE still keeps on monitoring PDCCH as PDCCH addressed to the C-RNTI or Temporary C-RNTI of the UE is not received, which will cause unnecessary UE battery consumption as UE is only necessary to monitor PDCCH when the contention resolution timer is running. Further, as shown in FIG. 3(B), if the no contention resolution message is received before the expiration of Contention Resolution Timer, UE still keeps on monitoring PDCCH when applying back off and waiting for next available PRACH resource as PDCCH addressed to the C-RNTI or Temporary C-RNTI of the UE is not received, which also will cause unnecessary UE battery consumption. In addition, as shown in FIG. 3(C), when no contention resolution message is received before the expiration of Contention Resolution Timer, at the next RA procedure round, UE still keeps on monitoring PDCCH before the TTI window is started, and also if no RA response is received within the TTI window, UE still keeps on monitoring PDCCH when applying back off and waiting for next available PRACH resource as PDCCH addressed to the C-RNTI or Temporary C-RNTI of the UE is not received, which will cause unnecessary UE battery consumption.

Figure 4:
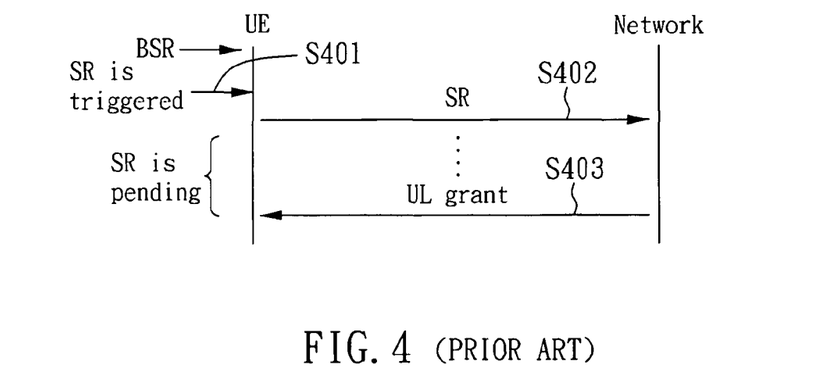
FIG. 4 schematically illustrates an SR with dedicated SR resource.

Another aspect is related to the Scheduling Request (SR) pending when UE is in DRX mode. A scheduling request is triggered in UE whenever a Regular Buffer Status Report (BSR) needs to be sent from UE but no UL resources is allocated for new transmission to the UE for this TTI, and is considered pending until UL resources are granted for a new transmission. As shown in FIG. 4, after a scheduling request is triggered (step S401), if there is a dedicated SR resource configured for UE, UE will send the SR on the resource to inform network the presence of the BSR (step 402) when the SR is pending until UL resources are granted for a new transmission (step S403). However if there is no dedicated SR resource configured for UE, as shown in FIG. 5, after a scheduling request is triggered (step 501), UE will initialize an RA procedure in order to transmit the BSR (step 502), in which SR is considered pending until UL resource (RA response) is granted for a new transmission (step 503).

Figure 5:
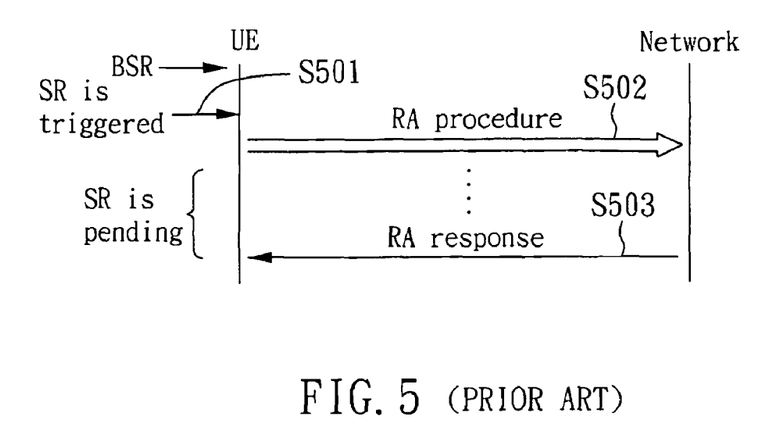
FIG. 5 schematically illustrates an SR with non-dedicated SR resource.
Figure 6:
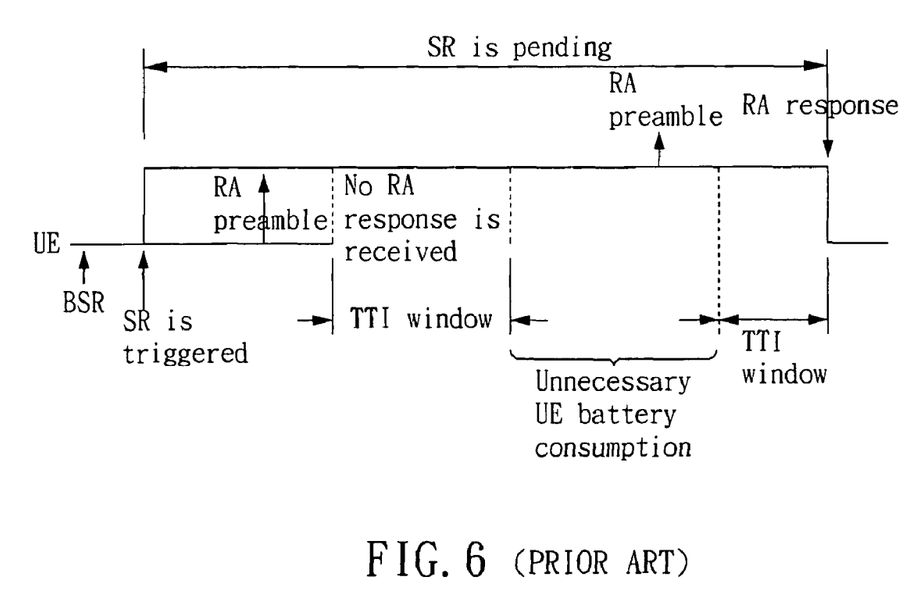
FIG. 6 schematically illustrates the behavior of the UE for SR with non-dedicated SR resource.

As shown in FIGS. 4 and 5, a triggered SR is considered pending until UL resources are granted for a new transmission, but such condition will cover some subframes in which UE doesn't need to monitor PDCCH if RA procedure is initiated when there's no dedicated SR resource which is configured for the UE to send SR. FIG. 6 shows the UE behavior according to current specification before RA response is received: the SR is considered pending so that the UE will keep on awake to monitor PDCCH, but in fact after the TTI window, UE would take some time decoding the PDCCH for the last TTI of the window and decided no response is received, and it will apply back off. After back off is performed, it will wait for next available PRACH resource for preamble re-attempt, and some time, e.g. 2 ms in FIG. 6 after preamble transmission, which is the time for the network to process the preamble and generate the RA response, it will start the TTI window. So during the time covered by SR being pending, there's a lot of time UE need not monitor PDCCH.

Therefore, it is desirable to provide an improved method for optimizing discontinuous reception in random access and scheduling request to mitigate and/or obviate the aforementioned problems.

SUMMARY OF THE INVENTION

The object of the present invention is to provide a method for optimizing discontinuous reception mechanism in random access and scheduling request, so as to eliminate the aforementioned problems.

According to one aspect, the present invention which achieves the object relates to a method for optimizing discontinuous reception mechanism in random access applied in E-UTRA network environment, with which a user equipment monitors PDCCH within a TTI window at active time, wherein during a contention based random access, the user equipment monitor the PDCCH at the active time when a contention resolution timer is running, and the user equipment monitors the PDCCH at the active time while the PDCCH indicating new transmission addressed to C-RNTI of the user equipment has not been received after successful receiving a random access response for a non-contention random access preamble during a non-contention based random access.

According to another aspect, the present invention which achieves the object relates to a method for optimizing discontinuous reception mechanism in scheduling request applied in E-UTRA network environment, with which a user equipment monitors PDCCH at active time, wherein in a scheduling request with non-dedicated scheduling request resource, the user equipment monitors PDCCH within a TTI window and is at the active time to monitor PDCCH when a contention resolution timer is running, and wherein the user equipment monitors PDCCH at the active time while an up-link grant for the user equipment has not been received after a scheduling request has been sent in a scheduling request with dedicated scheduling request resource.

Other objects, advantages, and novel features of the invention will become more apparent from the following detailed description when taken in conjunction with the accompanying drawings.

DETAILED DESCRIPTION OF THE PREFERRED EMBODIMENT

Reference will now be made in detail to present embodiments of the present invention, examples of which are illustrated in the accompanying drawings. Wherever possible, the same reference numbers will be used throughout the drawings to refer to the same or like parts.

Figure 7:
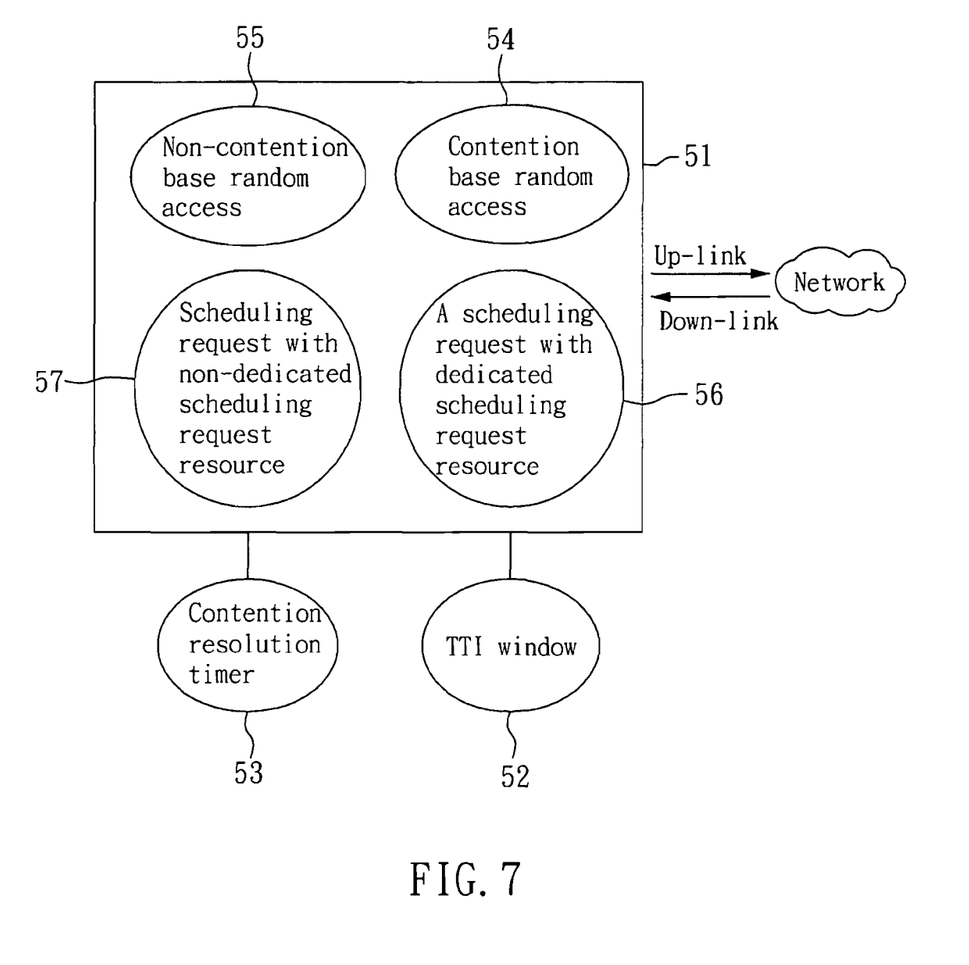
FIG. 7 shows an E-UTRA network environment executed therein a method for optimizing discontinuous reception mechanism in random access and scheduling request in accordance with the invention.

FIG. 7 schematically illustrates an E-UTRA network environment executed therein a method for optimizing discontinuous reception mechanism in random access and scheduling request. Based on the discontinuous reception mechanism, a user equipment (UE) 51 behaves according to a TTI window 52 and a contention resolution timer 53 and predetermined conditions to be fulfilled. The user equipment 51 monitors PDCCH within the TTI window 52 and is at active time to monitor PDCCH when the contention resolution timer 53 is running. Further, the discontinuous reception mechanism can be applied to a contention based random access 54, a non-contention based random access 55, a scheduling request with dedicated scheduling request resource 56, and a scheduling request with non-dedicated scheduling request resource 57.

Figure 8:
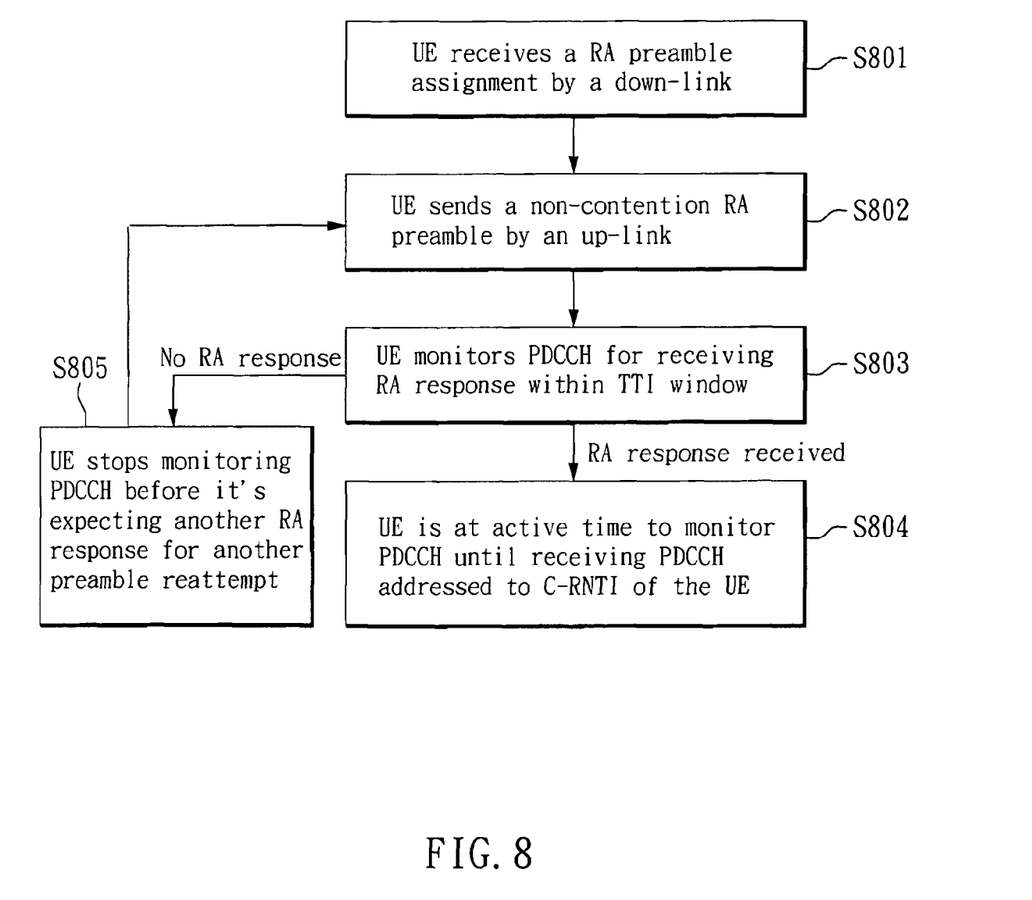
FIG. 8 shows the flowchart of the method for optimizing discontinuous reception mechanism in non-contention based random access.
Figure 9A:
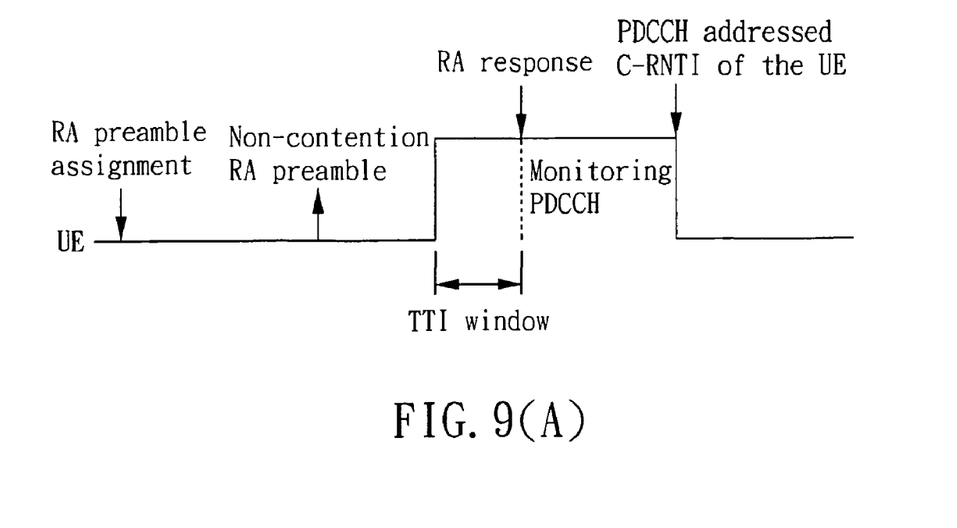
FIGS. 9(A)-(B) show the behavior of the UE for the method for optimizing discontinuous reception mechanism in non-contention based random access.
Figure 9B:
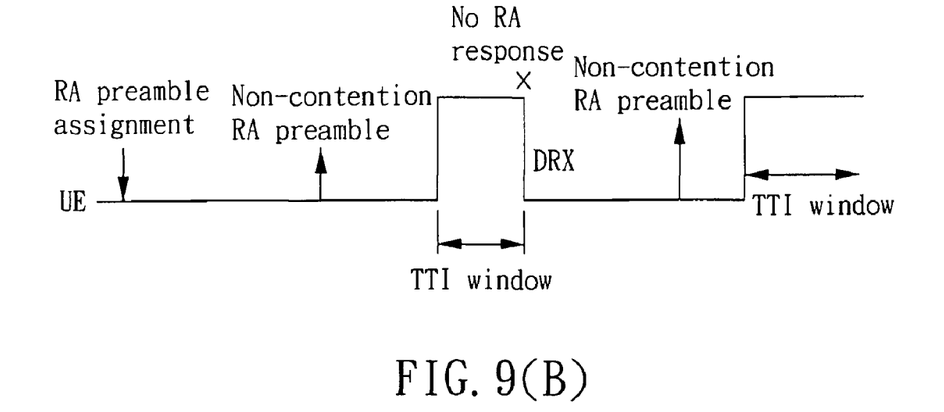

In the random access (RA) procedure, when a DRX cycle is configured, the Active Time includes "the time while a PDCCH indicating a new transmission addressed to the C-RNTI of the UE has not been received after successful reception of a Random Access Response for non-contention preamble", which replaces "the time while a PDCCH indicating a new transmission addressed to the C-RNTI or Temporary C-RNTI of the UE has not been received after successful reception of a Random Access Response" originally defined in the DRX mechanism. Based on this active time definition, FIG. 8 and FIGS. 9(A)-(B) respectively show the flowchart of the method for optimizing discontinuous reception mechanism in non-contention based random access and the corresponding behavior of the UE. As shown in FIG. 8 and FIG. 9(A), in a non-contention based random access 55 applied in E-UTRA network environment, the UE 51 first receives a random access preamble assignment from the network via a down-link (step S801). Next, the UE 51 sends a non-contention RA preamble as assigned in step S801 to the network by an up-link (step S802). Then, the UE 51 monitors PDCCH for receiving the RA response within a TTI window, so as to receive an RA response from the network by a down-link (step S803). Finally, the UE 51 is at active time to monitor PDCCH until receiving a PDCCH indicating a new transmission addressed to the C-RNTI of the UE 51 (step S804), which conforms to the active time defined in DRX and including the time while a PDCCH indicating a new transmission addressed to the C-RNTI of the UE has not been received after successful reception of a Random Access Response for non-contention RA preamble. With reference to FIG. 8 and FIG. 9(B), when no RA response for the non-contention RA preamble is received within the TTI window, the UE is allowed to stop monitoring PDCCH until it's expecting another RA response for another preamble transmission reattempt (step S805). The UE reattempts preamble transmission at next available PRACH resource and shall start monitor PDCCH within TTI window for random access response after it transmitted preamble.

Figure 10:
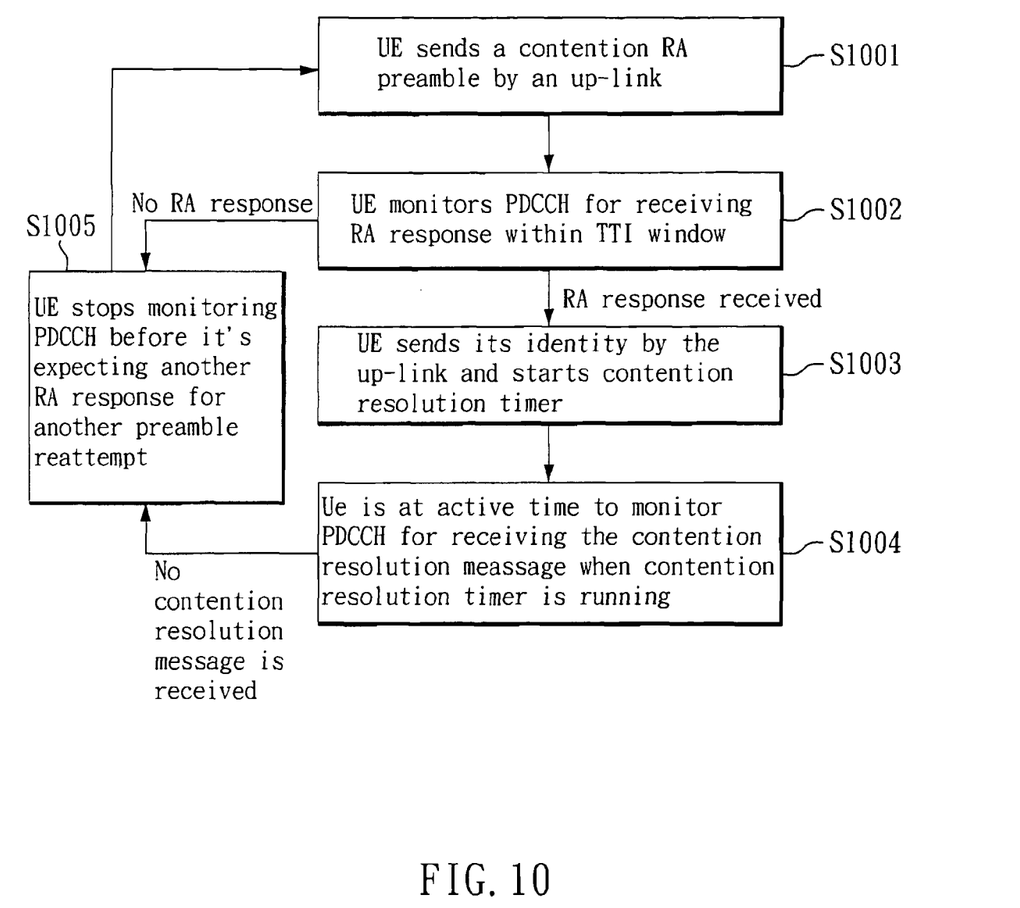
FIG. 10 shows the flowchart of the method for optimizing discontinuous reception mechanism in contention based random access.
Figure 11A:
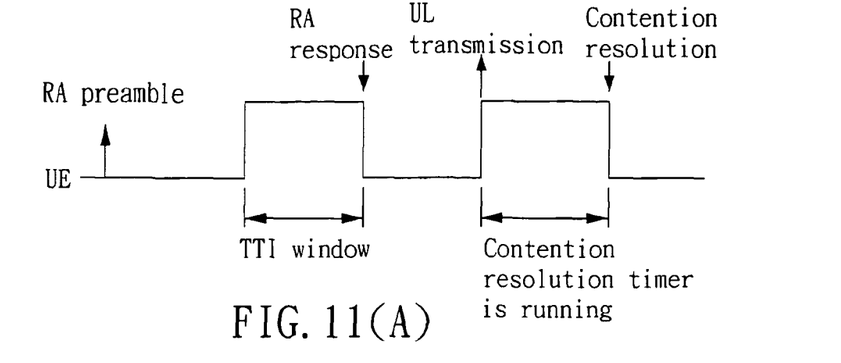
FIGS. 11(A)-(C) show the behavior of the UE for the method for optimizing discontinuous reception mechanism in contention based random access.
Figure 11B:
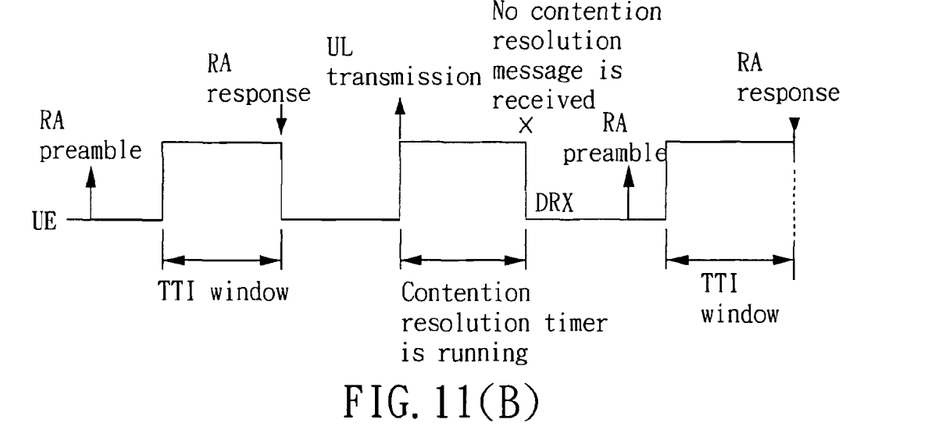

FIG. 10 and FIGS. 1(A)-(C) further show the flowchart of the method for optimizing discontinuous reception mechanism in contention based random access and the corresponding behavior of the UE. As shown in FIG. 10 and FIG. 11(A), in a contention based random access 54 applied in E-UTRA network environment, the UE 51 first sends a randomly selected contention RA preamble to the network by an up-link (step S1001). Next, the UE 51 monitors PDCCH for receiving an RA response within the TTI window, so as to receive the RA response from the network via a down-link (step S1002). Upon receiving the RA response, UE 51 will not keep on monitoring PDCCH as the active time defined in DRX including "the time while a PDCCH indicating a new transmission addressed to the C-RNTI of the UE has not been received after successful reception of a Random Access Response for non-contention preamble" is not applied in this case, so as to avoid unnecessary UE battery consumption. Then, the UE 51 sends its identity (message 3) to the network by the up-link and starts the contention resolution timer 53 (step S1003). Finally, the UE 51 is at active time to monitor PDCCH for receiving the contention resolution message when the contention resolution timer 53 is running (step S1004). With reference to FIG. 10 and FIG. 11(B), when no contention resolution message is received before expiration of the contention resolution timer 53, the UE 51 is allowed to stop monitoring PDCCH until it's expecting another RA response for another preamble transmission reattempt (step S1005). The UE 51 reattempts preamble transmission at next available PRACH resource after back off and shall start monitor PDCCH within TTI window for random access response after it transmitted preamble.

Figure 11C:
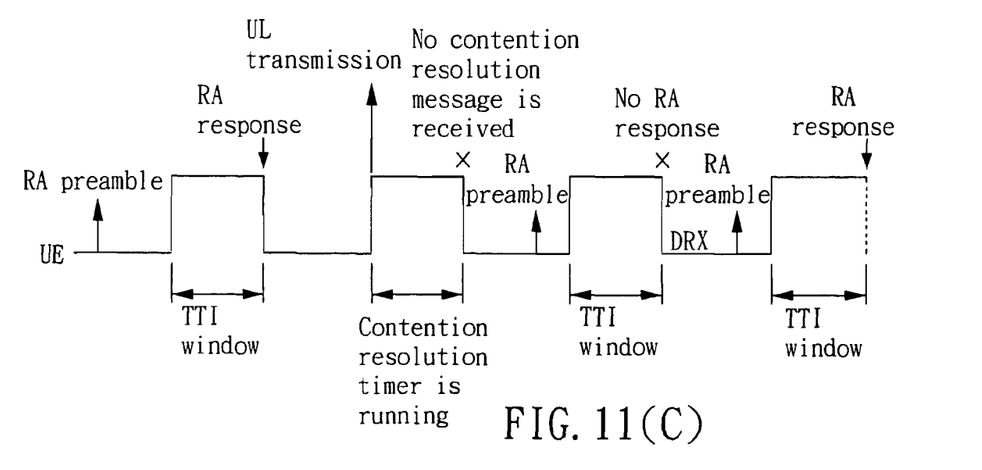

With reference to FIG. 10 and FIG. 11(C), when no contention resolution message is received before expiration of the contention resolution timer 53, at the next RA procedure round, if no RA response for the contention RA preamble is received within the TTI window, the UE 51 is allowed to stop monitoring PDCCH until it's expecting another RA response for another preamble transmission reattempt (step S1005). The UE reattempts preamble transmission at next available PRACH resource after back off and shall start monitor PDCCH within TTI window for RA response after it transmitted preamble.

Figure 12:
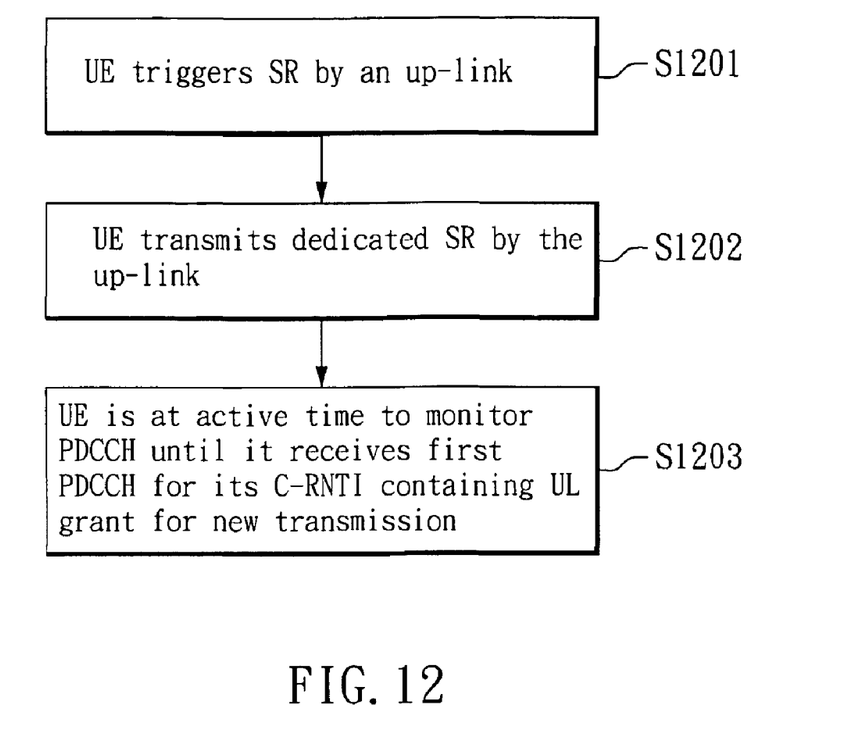
FIG. 12 shows the flowchart of the method for optimizing discontinuous reception mechanism in scheduling request with dedicated scheduling request resource.
Figure 13:
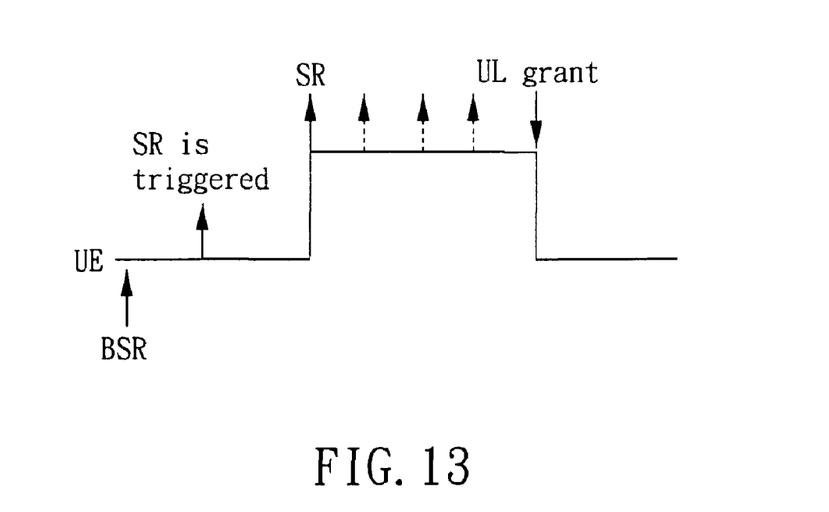
FIG. 13 shows the behavior of the UE for the method for optimizing discontinuous reception mechanism in scheduling request with dedicated scheduling request resource.

In the scheduling request (SR) procedure, when a DRX cycle is configured, the Active Time includes "an UL grant for the UE has not been received after SR has been sent", which replaces "a Scheduling Request is pending" originally defined in the DRX mechanism. Based on this active time definition, FIG. 12 and FIG. 13 respectively show the flowchart of the method for optimizing discontinuous reception mechanism in scheduling request with dedicated scheduling request resource 56, and the corresponding behavior of the UE. As shown, in a SR with dedicated SR resource 56 applied in E-UTRA network environment, the UE 51 first triggers an SR for reporting a BSR (step S1201). Next, the UE 51 transmits a dedicated scheduling request to the network by an up-link (step S1202) and is at active time to monitor PDCCH after transmission of dedicated SR until it receives first PDCCH for its C-RNTI containing UL grant for new transmission (step S1203), which conforms to the active time defined in DRX and including the time while an UL grant for the UE has not been received after SR has been sent.

Figure 14:
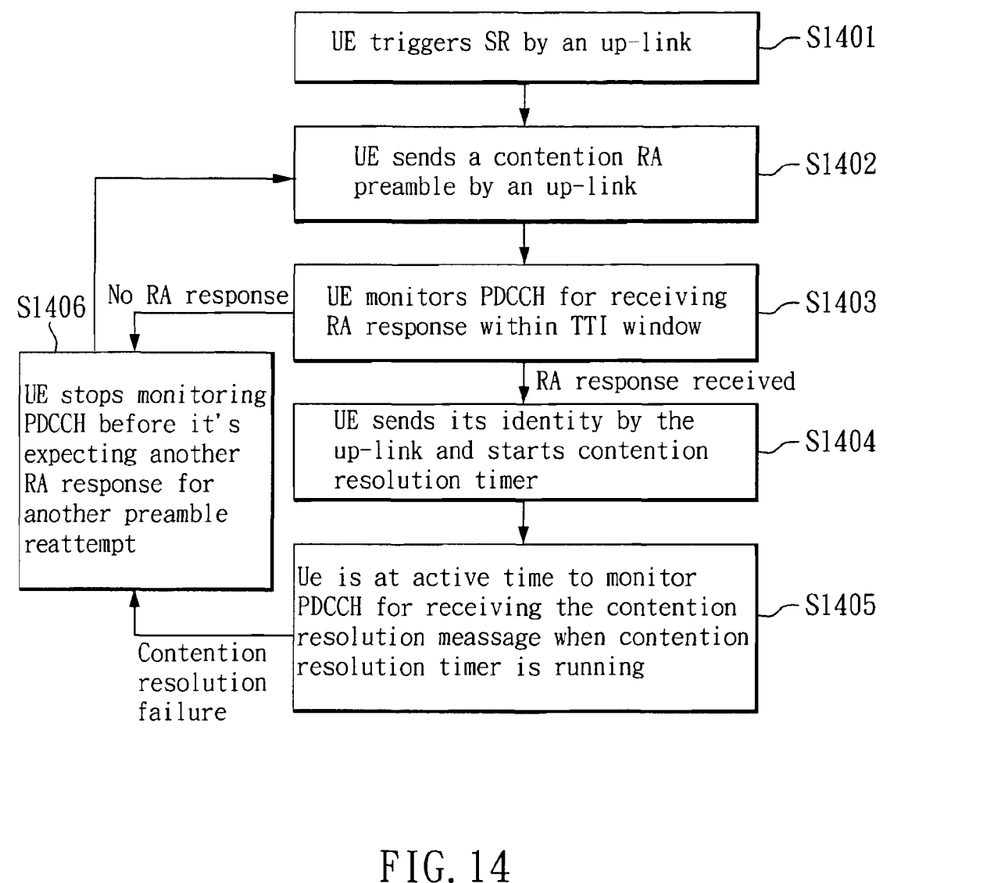
FIG. 14 shows the flowchart of the method for optimizing discontinuous reception mechanism in scheduling request with non-dedicated scheduling request resource.
Figure 15A:
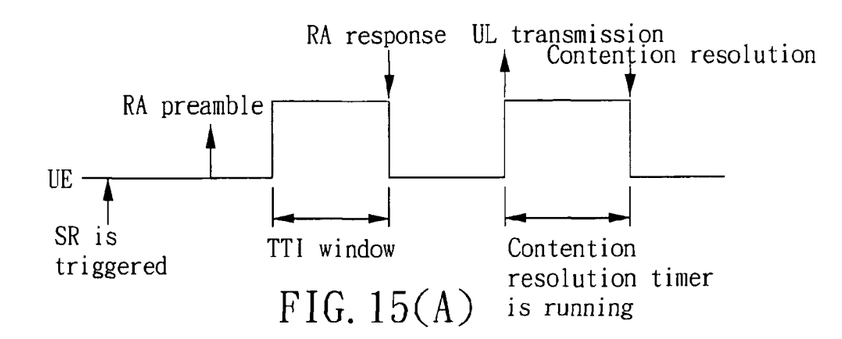
FIGS. 15(A)-(C) show the behavior of the UE for the method for optimizing discontinuous reception mechanism in scheduling request with non-dedicated scheduling request resource.
Figure 15B:
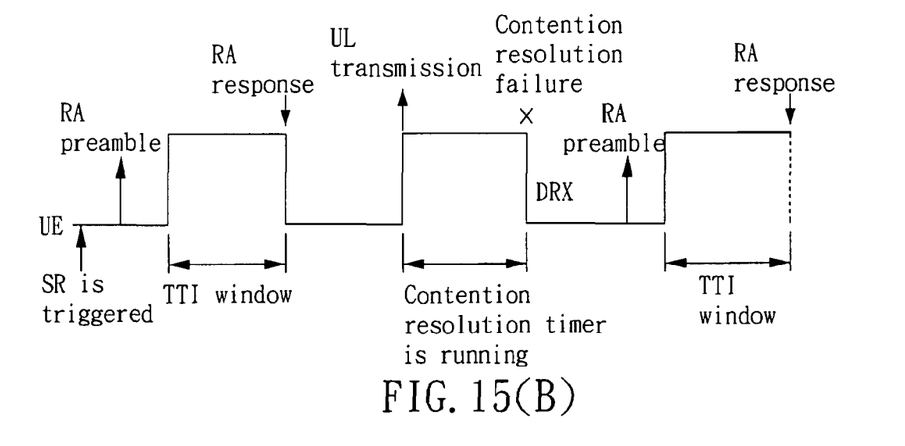
Figure 15C:
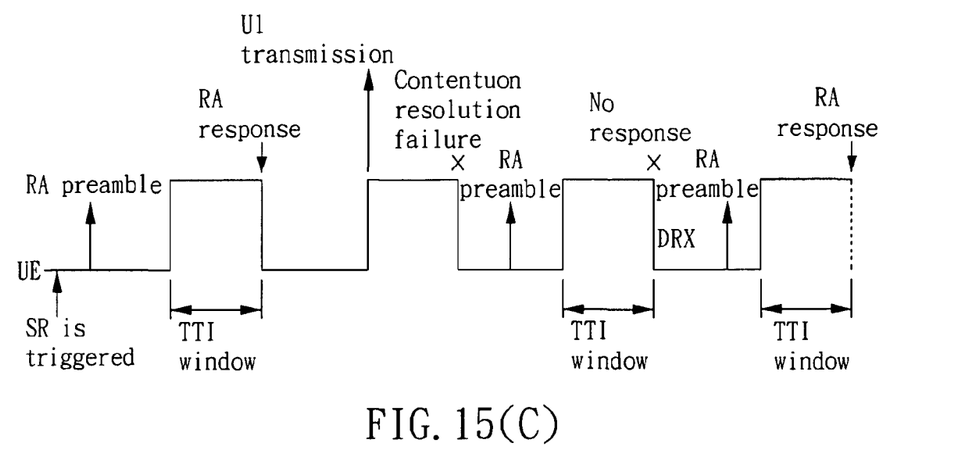

FIG. 14 and FIGS. 15(A)-(C) further show the flowchart of the method for optimizing discontinuous reception mechanism in scheduling request with non-dedicated scheduling request resource 57, and the corresponding behavior of the UE. As shown in FIG. 14 and FIG. 15(A), in a SR with non-dedicated SR resource 57 applied in E-UTRA network environment, the UE 51 first triggers a SR when a Regular BSR is triggered (step S1401) bus no UL resources is allocated for new transmission to the UE for this TTI. As there's no dedicated SR resource to send the SR, a contention based RA is initiated to request UL resource. That is, the UE 51 sends a randomly selected contention RA preamble to the network by an up-link (step S1402). Next, the UE 51 monitors PDCCH for receiving a RA response within the TTI window, so as to receive the RA response from the network via a down-link (step S1403). Then, the UE 51 sends its identity (message 3) to the network by the up-link and starts the contention resolution timer 53 (step S1404). Finally, the UE 51 is at active time to monitor PDCCH for receiving the contention resolution message when the contention resolution timer 53 is running (step S1405). As the time while SR is pending is no longer included in the active time, which is replaced by the time while an UL grant for the UE has not been received after SR has been sent, the UE 51 is not always at active time for monitoring PDCCH during the time covered by SR being pending, so as to avoid unnecessary UE battery consumption. With reference to FIG. 14 and FIG. 15(B), when UE fails the contention resolution, the UE 51 is allowed to stop monitoring PDCCH until it's expecting another RA response for another preamble transmission reattempt (step S1406). The UE 51 reattempts preamble transmission at next available PRACH resource after back off and shall start monitor PDCCH within TTI window for random access response after it transmitted preamble. With reference to FIG. 14 and FIG. 15(C), when UE fails the contention resolution and, at the next RA procedure round, if no RA response for the contention RA preamble is received within the TTI window, the UE 51 is allowed to stop monitoring PDCCH until it's expecting another RA response for another preamble transmission reattempt (step S1406). The UE reattempts preamble transmission at next available PRACH resource after back off and shall start monitor PDCCH within TTI window for RA response after it transmitted preamble. In view of the foregoing, it is known that the present invention is designed to avoid unnecessary UE battery consumption in discontinuous reception mechanism with random access and scheduling request. In the random access, the UE 51 is at active time while a PDCCH indicating a new transmission addressed to the C-RNTI of the UE has not been received after successful reception of a Random Access Response for the non-contention preamble, so as to make the random access procedure more clear by excluding the case of contention based RA procedure to thus avoid unnecessary power consumption. In the scheduling request, the UE 51 is at active time while an UL grant for the UE has not been received after SR has been sent, so as to make the scheduling request procedure more clear by excluding the case that the triggered SR initiates a RA procedure to thus avoid unnecessary power consumption.

Although the present invention has been explained in relation to its preferred embodiment, it is to be understood that many other possible modifications and variations can be made without departing from the spirit and scope of the invention as hereinafter claimed.

What is claimed is:

1. A method for optimizing discontinuous reception mechanism in random access applied in E-UTRA network environment, with which a user equipment monitors PDCCH within a TTI window and is at active time to monitor the PDCCH, wherein during a contention based random access, the user equipment monitor the PDCCH at the active time when a contention resolution timer is running, and the user equipment monitors the PDCCH at the active time while the PDCCH indicating new transmission addressed to C-RNTI of the user equipment has not been received after successful receiving a random access response for a non-contention random access preamble during a non-contention based random access, wherein in the contention based random access, the method comprises the steps of:
    (A) the user equipment sending a randomly selected contention random access preamble by an up-link;
    (B) the user equipment receiving a random access response from a down-link, wherein the user equipment monitors the PDCCH for receiving the random access response within the TTI window;
    (C) the user equipment sending its identity by the up-link; and
    (D) the user equipment receiving a contention resolution message from the down-link, wherein the user equipment monitors the PDCCH at the active time for receiving the contention resolution message when the contention resolution timer is running.

2. The method as claimed in claim 1, wherein in the contention based random access, the method further comprises the step of:
    (E) when the user equipment successful receives its random access response within TTI window, the user equipment stops monitoring PDCCH until the contention resolution timer starts.

3. The method as claimed in claim 2, wherein in the contention based random access, the method further comprises the step of:
    (G) when the random access response for the contention random access preamble is not received within the TTI window, the user equipment stops monitoring PDCCH until expecting another said random access response for another preamble transmission reattempt.

4. The method as claimed in claim 1, wherein in the contention based random access, the method further comprises the step of:
    (F) when the contention resolution message is not received before expiration of the contention resolution timer, the user equipment stops monitoring the PDCCH until expecting another said random access response for another preamble transmission reattempt.

5. A method for optimizing discontinuous reception mechanism in scheduling request applied in E-UTRA network environment, with which a user equipment monitors PDCCH at active time, wherein in a scheduling request with non-dedicated scheduling request resource, the user equipment monitors PDCCH within a TTI window and is at the active time to monitor PDCCH when a contention resolution timer is running, and wherein the user equipment monitors the PDCCH at the active time while an up-link grant for the user equipment has not been received after a scheduling request has been sent in a dedicated scheduling request resource, wherein in the scheduling request with non-dedicated scheduling request resource, the method comprises the steps of:
    (A) the user equipment triggering a scheduling request;
    (B) the user equipment randomly selecting and sending a contention random access preamble by an up-link;
    (C) the user equipment receiving a random access response from a down-link, wherein the user equipment monitors the PDCCH for receiving the random access response within the TTI window;
    (D) the user equipment sending its identity by the up-link; and
    (E) the user equipment receiving a contention resolution message from the down-link, wherein the user equipment monitors the PDCCH at the active time for receiving the contention resolution message when the contention resolution timer is running.

6. The method as claimed in claim 5, wherein in the scheduling request with non-dedicated scheduling request resource, the method further comprises the step of:
   (F) when the user equipment successful receives its random access response within the TTI window, the user equipment stops monitoring the PDCCH until the contention resolution timer starts.

7. The method as claimed in claim 5, wherein in the scheduling request with non-dedicated scheduling request resource, the method further comprises the step of:
   (G) when the user equipment fails contention resolution the user equipment stops monitoring the PDCCH until expecting another said random access response for another preamble transmission reattempt.

8. The method as claimed in claim 7, wherein in the scheduling request with non-dedicated scheduling request resource, the method further comprises the step of:
   (I) when the random access response for the contention random access preamble is not received within the TTI window, the user equipment stops monitoring the PDCCH until expecting another said random access response for another preamble transmission reattempt.

9. The method as claimed in claim 5, wherein in the scheduling request with non-dedicated scheduling request resource, the method further comprises the step of:
   (H) when the random access response for the contention random access preamble is not received within the TTI window, the user equipment stops monitoring the PDCCH until expecting another said random access response for another preamble transmission reattempt.

10. The method as claimed in claim 5, wherein, in the step (A), the user equipment triggers the scheduling request with non-dedicated scheduling request resource for reposting a buffer status report.

11. A method for optimizing discontinuous reception mechanism in random access applied in E-UTRA network environment, with which a user equipment monitors PDCCH within a TTI window and is at active time to monitor the PDCCH, wherein during a contention based random access, the user equipment monitor the PDCCH at the active time when a contention resolution timer is running, and the user equipment monitors the PDCCH at the active time while the PDCCH indicating new transmission addressed to C-RNTI of the user equipment has not been received after successful receiving a random access response for a non-contention random access preamble during a non-contention based random access, wherein in the non-contention based random access, the method comprises the steps of:
   (A) the user equipment receiving a random access preamble assignment by a down-link;
   (B) the user equipment sending said non-contention random access preamble by an up-link;
   (C) the user equipment receiving a random access response from the down-link, wherein the user equipment monitors the PDCCH for receiving the random access response; and
   (D) the user equipment receiving the PDCCH indicating a new transmission addressed to C-RNTI of the user equipment, wherein the user equipment is at the active time to monitor the PDCCH for receiving the PDCCH addressed to the user equipment.

12. A method for optimizing discontinuous reception mechanism in scheduling request applied in E-UTRA network environment, with which a user equipment monitors PDCCH at active time, wherein in a scheduling request with non-dedicated scheduling request resource, the user equipment monitors PDCCH within a TTI window and is at the active time to monitor PDCCH when a contention resolution timer is running, and wherein the user equipment monitors the PDCCH at the active time while an up-link grant for the user equipment has not been received after a scheduling request has been sent in a dedicated scheduling request resource, wherein in the scheduling request with dedicated scheduling request resource, the method comprises the steps of:
   (A) the user equipment triggering a scheduling request;
   (B) the user equipment transmitting a scheduling request by the uplink; and
   (C) the user equipment receiving an up-link grant for new transmission by a down-link, wherein the user equipment monitors the PDCCH at the active time for receiving the up-link grant.

13. The method as claimed in claim 12, wherein, in step (A), the user equipment triggers the scheduling request with dedicated scheduling request resource for reporting a buffer status report.

* * * * *